United States Patent [19]

Hoffmann et al.

[11] Patent Number: 4,900,795
[45] Date of Patent: Feb. 13, 1990

[54] POLYMER AMMONIUM SALTS

[75] Inventors: Gerhard Hoffmann, Otterstadt; Wolfgang Huemmer, Limburgerhof; Horst Koch, Gruenstadt; Dieter Littmann, Ludwigshafen, all of Fed. Rep. of Germany

[73] Assignee: BASF Aktiengesellschaft, Ludwigshafen, Fed. Rep. of Germany

[21] Appl. No.: 200,951

[22] Filed: Jun. 2, 1988

[30] Foreign Application Priority Data

Jun. 2, 1987 [DE] Fed. Rep. of Germany ....... 3718447

[51] Int. Cl.$^4$ ................................................ C08F 8/44
[52] U.S. Cl. ............................. 525/329.9; 525/329.4; 525/330.5; 525/379; 522/65
[58] Field of Search ............... 525/279, 281, 282, 283, 525/329.9, 329.4, 376, 379, 382

[56] References Cited

U.S. PATENT DOCUMENTS 3,264,272 8/1966 Rees .
4,777,115 10/1988 Koch et al. .......................... 430/281

FOREIGN PATENT DOCUMENTS 0198392 10/1986 European Pat. Off. .
0200463 11/1986 European Pat. Off. .
2341462 2/1974 Fed. Rep. of Germany .

OTHER PUBLICATIONS

Reactive Monomers—Nissan Blemmer G, High Polymer Modifiers (Nippon Oil & Facts, Co., Ltd.), 1968.
U.S. Ser. No. 932,355—Koch (Corresponds to DE 3 540 950, Fed. Rep. of Germany).
U.S. Ser. No. 7,471—Koch (Corresponds to DE 3 602 472, Fed. Rep. of Germany & U.S. Pat. No. 4,762,892).

Primary Examiner—Joseph L. Schofer
Assistant Examiner—T. McDonald, Jr.
Attorney, Agent, or Firm—Keil & Weinkauf

[57] ABSTRACT

In polymer ammonium salts which are formed from a copolymer (A) which can be modified by a polymer-analogous reaction and from one or more amines (B), the copolymer (A) is obtainable by copolymerization of a monomer mixture of
($a_1$) ethylene,
($a_2$) acrylic acid and/or methacrylic acid, and
($a_3$) one or more further monomers from the group consisting of the vinyl esters, vinyl ethers, acrylates, methacrylates, acrylamides and methacrylamides, and the amines (B) are selected from the group consisting of the
($b_1$) cyclic amines of the general formula I

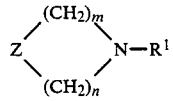

and/or from the group consisting of the
($b_2$) open-chain amines of the general formula II

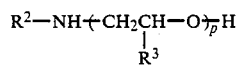

and/or from the group consisting of
($b_3$) 1,4-thiazine, N,N',N''-trisvinylmelamine and N,N',N''-triallylmelamine, Z, $R^1$, $R^2$ and $R^3$ having the meanings stated in the description.

8 Claims, No Drawings

POLYMER AMMONIUM SALTS

The present invention relates to novel polymer ammonium salts which are formed from a copolymer (A) which can be modified by polymer-analogous reactions and from one or more amines (B), the copolymer (A) being obtainable by copolymerization of a monomer mixture which consists of ($a_1$) ethylene,
($a_2$) acrylic acid and/or methacrylic acid and
($a_3$) one or more further monomers from the group consisting of the vinyl esters, vinyl ethers, acrylates, methacrylates, acrylamides and methacrylamides, for whose weight ratios the following conditions apply: parts by weight of ($a_1$)+($a_2$)+($a_3$)=100, 30 parts by weight $\leq$ parts by weight of ($a_1$) $\leq$ 70 parts by weight,
5 parts by weight $\leq$ parts by weight of ($a_2$) $\leq$ 50 parts by weight and
5 parts by weight $\leq$ parts by weight of ($a_3$) $\leq$ 40 parts by weight.

The present invention furthermore relates to mixtures which are crosslinkable by photopolymerization and which are prepared using these polymer ammonium salts.

EP-A-O 198 392 proposes improving the shelf life and the processing properties of a photoresist which can be developed in an aqueous medium and is based on a carboxylcontaining ethylene/vinyl acetate copolymer which can be processed in an aqueous medium and has an acid number of from 40 to 160, by partial neutralization of from 15 to 55% of the carboxyl groups with triethylamine, triethanolamine, 2-amino-2-ethyl-1,3-propanediol, N,N-dimethylaniline, N,N,N',N'-tetra-(2-hydroxyethyl)-ethylenediamine, N,N,N',N'-tetramethylbutanediamine, N,N-diethylaminoethyl acrylate, N,N-diethylaminoethyl methacrylate or N,N-dimethylaminoethyl acrylate. As a result, it should be possible in particular for the photoresist which is crosslinkable by photopolymerization to be applied to a substrate film and then rolled up without damage and to be separated rapidly from the substrate film again for use.

EP-A-O 200 463 proposes reducing the viscosity of a coating agent consisting of an organic solvent, a photopolymerizable mixture dissolved therein and based on carboxyl-containing binders and a thixotropic filler by the addition of special amines. Suitable binders are acrylic acid or methacrylic acid polymers or their copolymers with acrylates, vinyl ethers, vinyl acetate or its hydrolysis products, styrene, vinylpyrrolidone or butadiene; polyacrylic anhydrides; copolymers of maleic anhydride, maleic semiesters or amides or of anhydrides or derivatives of itaconic acid with styrene, vinyl ethers or vinyl acetate. Suitable amines include tris-(2-aminoethyl)-amine, tris-(2-hydroxyethyl)-amine, N-(2-hydroxyethyl)-amine, N,N-bis-(2-hydroxyethyl)-amine, N-(2-hydroxyethyl)-N,N-dimethylamine. M.M-bis-(2-hydroxyethyl)-N-methylamine, 1-amino-3-hydroxypropane or piperazine. The object of this measure is to increase the content of the filler in the coating agent without an undesirable increase in the viscosity occurring.

Furthermore, polymer ammonium salts of copolymers (a) and the amines ethylenediamine, diethylenetriamine, N-methyl-N-ethylethylenediamine, N,N-dimethylethylenediamine, N,N'-diethylethylenediamine, N,N,N',N-40 -tetramethylethylenediamine, N,N,N'', N'''-tetramethylethylenetriamine, propane-1,3-diyldiamine or butane-1,4-diyldiamine and pyrazine, polyvinylpyridine or hydrazine are described in the copending U.S. patent application Ser. No. 06/932355 now U.S. Pat. No. 4,777,115 of the same assignee.

The corresponding ammonium salts of copolymers (A) modified by polymer-analogous reactions, including those with ammonia, are described in the copending U.S. patent application Ser. No. 07/007471 now U.S. Pat. No. 4,762,892 of the same assignee. These polymer ammonium salts are formed by copolymers (A) which contain olefinically unsaturated side radicals (C) introduced by polymer-analogous reactions and/or side radicals (D) which possess polar groups.

The polymer ammonium salts described in the copending U.S. patent applications Ser. Nos. 06/932355 and 07/007471 have in principle good performance characteristics and are suitable for the preparation of stable, photopolymerizable mixtures which are easy to handle, have a long shelf life and can be further processed to give photopolymerized materials, printing plates, relief plates or photoresists. The photopolymerizable materials, printing plates, relief plates or photoresists produced therefrom are heat-stable, stable to ozone cracking, abrasion-resistant and resistant to printing ink solvents. Nevertheless, the polymer ammonium salts described to date must be further developed in order to meet the constantly growing requirements in industry with regard to photopolymerizable materials, printing plates, relief plates and photoresists.

It is an object of the present invention further to develop the polymer ammonium salts described to date in order to obtain novel polymer ammonium salts which have improved performance characteristics and permit the production of novel photopolymerizable materials, printing plates, relief plates and photoresists which meet the higher requirements of industry, and give the corresponding photopolymerized materials, printing plates, relief plates and photoresists.

We have found that this object is achieved, according to the invention, by novel polymer ammonium salts which are formed from a copolymer (A) which can be modified by a polymer-analogous reaction and from one or more amines (B), the copolymer (A) being obtainable by copolymerization of a monomer mixture which consists of ($a_1$) ethylene,
($a_2$) acrylic acid and/or methacrylic acid and
($a_3$) one or more further monomers from the group consisting of vinyl esters, vinyl ethers, acrylates, methacrylates, acrylamides and methacrylamides, for whose weight ratios the following conditions apply: parts by weight of ($a_1$)+($a_2$)+($a_3$)=100, 30 parts by weight $\leq$ parts by weight of ($a_1$) $\leq$ 70 parts by weight,
5 parts by weight $\leq$ parts by weight of ($a_2$) $\leq$ 50 parts by weight and
5 parts by weight $\leq$ parts by weight of ($a_3$) $\leq$ 40 parts by weight, wherein, in the novel polymer ammonium salt, the amines (B) are selected from the group consisting of the
($b_1$) cyclic amines of the general formula I

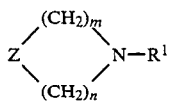   I where $R^1$ is hydrogen, $C_1$–$C_6$-alkyl, ω-hydroxy-$C_1$–$C_6$-alkyl or (ω-hydroxypolyalkylene oxide)-α-yl, Z is oxygen, sulfur, NH or $C_1$–$C_5$-alkylidene and n and m are each an integer from 1 to 4, and/or from the group consisting of the (b$_2$) open-chain amines of the general formula II

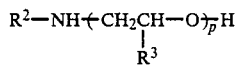   II where $R^2$ is $C_1$–$C_5$-alkyl, phenyl, hydroxyl, ω-amino- or ω-thiolo-$C_2$–$C_{10}$-alkyl or a (ω-hydroxypolyalkylene oxide), (ω-aminopolyalkyleneimine) or (ω-thiolopolyalkylene sulfide)-α-yl group, $R^3$ is hydrogen or $C_1$–$C_5$-alkyl and p is an integer from 1 to 10, and/or from the group consisting of (b$_3$0) 1,4-thiazine, N,N',N''-trisvinylmelamine and N,N',N''-trisallylmelamine.

The novel polymer ammonium salts are solid, elastomeric and non-tacky and are distinguished by excellent solubility or dispersibility in the usual solvents, in particular in water. After the addition of suitable additives, they can be photopolymerized, and they are distinguished by particularly good compatibility with these additives. This particularly good compatibility goes beyond that of the known polymer ammonium salts.

The novel photopolymerizable materials, printing plates, relief plates and photoresists based on the novel polymer ammonium salts are resilient and dimensionally stable and have a longer shelf life than the corresponding known materials. The novel photopolymerizable materials, printing plates, relief plates and photoresists based on the novel polymer ammonium salts are highly elastomeric, heat-stable, stable to ozone cracking, particularly abrasion-resistant and nontacky, and they furthermore have a particularly high elongation at break. Moreover, the novel printing plates, relief plates and photoresists can, after imagewise exposure to actinic light, be rapidly developed with water under conditions relevant in practice, without material damage.

For the purposes of the present invention, materials are referred to as compatible when they are capable of remaining dispersed in one another. The term materials refers to adhesive materials or sealant materials.

Copolymers (A) which can be modified by polymer-analogous reactions and consist of (a$_1$) ethylene, (a$_2$) acrylic acid and/or methacrylic acid and (a$_3$) one or more further monomers from the group consisting of the vinyl esters, vinyl ethers, acrylates, methacrylates, acrylamides and methacrylamides, such as those on which the novel polymer ammonium salts according to the invention are based, are known per se.

They can be prepared, for example, by the LDPE (=low density polyethylene) high pressure polymerization method at from 200° to 400° C. and under more than 800 kg/cm$^2$ [cf. for example DE-C 23 41 462 and US-A 3 264 272].

Vinyl esters which are suitable as comomers (a$_3$) are, in particular, those of the general formula V

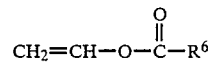   V where $R^6$ is an alkyl or cycloalkyl radical of 1 to 10 carbon atoms, e.g. vinyl acetate, vinyl propionate, vinyl butyrate, vinyl valerate or vinyl hexanecarboxylate. Vinyl acetate is preferred.

Vinyl ethers which are particularly suitable as comonomers (a$_3$) are those of the general formula VI $$CH_2=CH-OR^6 \qquad \text{VI}$$

where $R^6$ has the above meanings, e.g. vinyl ethyl ether, vinyl prop-1-yl ether, vinyl prop-2-yl ether, vinyl but-1-yl ether, vinyl but-2-yl ether or vinyl pent-1-yl ether. Vinyl but-1-yl ether is preferred.

Acrylates, methacrylates, acrylamides and methacrylamides which are suitable as comonomers (a$_3$) are, in particular, those of the general formula VII

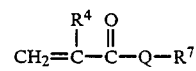   VII where $R^4$ has the meanings stated for formula III and $R^7$ is an alkyl or cycloalkyl radical of 1 to 10 carbon atoms or ω-methyl-poly-(alkylene oxide)-α-yl and Q is oxygen or an $NR^8$ group where $R^8$ is H or $C_1$–$C_4$-alkyl. Examples of suitable acrylates, methacrylates, acrylamides and methacrylamides are methyl acrylate, methyl methacrylate, ethyl acrylate, ethyl methacrylate, propyl acrylate, propyl methacrylate, n-butyl acrylate, n-butyl methacrylate, n-pentyl acrylate, n-pentyl methacrylate, n-hexyl acrylate, n-hexyl methacrylate, tert-butyl acrylate, cyclohexyl acrylate, cyclohexyl methacrylate, 2-ethylhexyl acrylate, 2-ethylhexyl methacrylate, dicyclopentadienyl acrylate, ω-methylpoly-(ethylene oxide)-α-yl (meth)acrylate, ω-methylpoly-(propylene 1,2-oxide)-α-yl (meth)acrylate, ω-methylpoly-(propylene 1,3-oxide)-α-yl (meth)acrylate, N-methyl-N-butylmethacrylamide and N-ethyl-N-(2-ethylhexyl)-acrylamide. N-Butyl acrylate, 2-ethylhexyl acrylate, ω-methylpoly-(ethylene oxide)-α-yl acrylate and dicyclopentadienyl acrylate are preferred, the first three being particularly preferred.

Preferred copolymers (A) are ethylene/(meth)acrylic acid copolymers which contain n-butyl acrylate, 2-ethylhexyl acrylate and/or ω-methylpoly-(ethylene oxide)-α-yl acrylate as polymerized comonomers (a$_3$). Advantageous copolymers (A) generally have a Shore A hardness of more than 10, in particular from 15 to 75.

The copolymers (A) of the novel polymer ammonium salts can contain olefinically unsaturated side radicals (C) which have been introduced by a polymer-analogous reaction and are of the general formula III

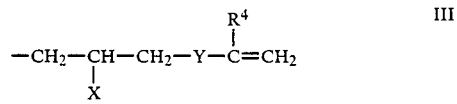   III where X is hydroxyl, amino or thiol, Y is an ester, amine, ether or $C_1$–$C_{10}$-alkanediyl group and $R^4$ is hydrogen or methyl.

Examples of suitable olefinically unsaturated side radicals (C) are 2-hydroxy-5-oxo-4-oxahept-6-en-1-yl, 2-amino-5-oxo-4-oxahept-6-en-1-yl, 2-thiolo-5-oxo-4-oxahept-6-en-1-yl, 2-hydroxy-5-oxo-4-oxa-6-methylhept-6-en-1-yl, 2-amino-5-oxo-4-oxa-6-methylhept-6-en-1-yl, 2-hydroxy-5-oxo-4-azahept-6-en-1-yl, 2-amino-5-oxo-4-azahept-6-en-1-yl, 2-thiolo-5-oxo-5-azahept-6-en-1-yl, 2-hydroxy-5-oxo-4-aza-6-methylhept-6-en-1-yl, 2-hydroxy-5,10-dioxo-4,9-dioxa-6-aza-11-methyldodec-11-en-1-yl, 2-amino-5-oxo-4-aza-6-methylhept-6-en-1-yl, 2-thiolo-5-oxo-4-aza-6-methylhept-6-en-1-yl, 2-hydroxy-4-oxahex-5-en-1-yl, 2-amino-4-oxahex-5-en-1-yl, 2-thiolo-4-oxahex-5-en-1-yl, 2-hydroxyhex-5-en-1-yl, 2-aminohex-5-en-1-yl, 2-thiolohex-5-en-1-yl, 2-hydroxyhept-6-en-1-yl, 2-aminohept-6-en-1-yl or 2-thiolohept-6-en-1-yl. The 2-hydroxy-5-oxo-4-oxa-6-methylhept-6-en-1-yl radical VIII

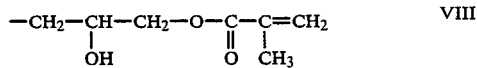

is preferred.

In addition to the radicals (C) or instead of these, the copolymers (A) of the novel polymer ammonium salts may additionally contain side radicals (D) which have been introduced by a polymer-analogous reaction and are of the general formula (IV)

where $R^5$ is a polar group, hydrogen or a further group X and X has the meanings stated for formula III.

Polar groups are those groups which are capable of dipole-dipole, dipole-ion or ion-ion interaction.

Examples of suitable radicals (D) are 2-hydroxyeth-1-yl, 2-aminoeth-1-yl, 2-thioloeth-2-yl, 2,3-dihydroxyprop-1-yl, 2-amino-3-hydroxyprop-1-yl, 2-thiolo-3-hydroxyprop-1-yl and 2-hydroxy-2-[ω-alkylpoly-(ethylene oxide)-α-yl]-eth-1-yl.

In a preferred procedure, the radicals (C) and/or the radicals (D) are introduced into the copolymers (A) by reacting some of the carboxyl groups in the copolymers (A) with suitable oxiran-2-yl, thiiran-2-yl and aziridin-2-yl compounds. In order to ensure that free carboxyl groups are still available in the end products for ammonium salt formation, it is necessary in general to allow only some of the carboxyl groups to react during the introduction of the radicals (C) and/or (D). Thus, it is advantageous to convert not more than 50 mol % of the carboxyl groups present in copolymer (A) in this manner.

The reaction of carboxyl-containing compounds with oxiran-2-yl, thiiran-2-yl or aziridin-2-yl compounds with ring cleavage and formation of an α-thiol- and α-amino ester is known per se and is described in, for example, the company publication entitled Reactive Monomers, Nissan Blemmer G, High Polymer Modifiers (Nippon Oil and Fats, Co. Ltd.) from 1968. It is also known that glycidyl compounds can also be used instead of oxiran-2-yl compounds. In a preferred procedure, the copolymers (A) are reacted with these compounds in solvents such as tetrahydrofuran, toluene, ethylbenzene, methyl ethyl ketone, methyl isobutyl ketone or mixtures of these. To the solutions of the copolymers (A), p-dimethylaminopyridine or N-methylimidazole may be added as catalyst and, for example, 2,6-di-tert-butyl-p-cresol or N-nitrosodiphenylamine as an inhibitor. The desired amount of oxiran-2-yl or glycidyl, thiiran-2-yl or aziridin-2-yl compound is added dropwise to these solutions at a rate such that the temperature of the reaction mixture is from 40° to 110° C. If necessary, the temperature is adjusted by heating or cooling. After the dropwise addition, the reaction mixture is stirred for a further 3–10 hours at 50° C., and the solvent is removed in a suitable manner, for example by distillation under reduced pressure. In a further advantageous procedure, the copolymer (A) is reacted with the abovementioned compounds in a kneader, for example at from 125° to 180° C. in the course of from 3 to 60 minutes, or the reaction is carried out in a twin-screw extruder with a residence time of from 5 to 10 minutes.

Suitable compounds for the reaction to introduce the radicals (C) are, for example, oxiran-2-ylmethyl acrylate, oxiran-2-ylmethylol methacrylate, glycidyl acrylate, glycidyl methacrylate, 2-(3,8-dioxo-2,7-dioxa-4-aza-9-methyldec-9-en-1-yl)-oxirane, aziridin-2-ylmethylol acrylate, aziridin-2-ylmethylol methacrylate, thiiran-2-ylmethylol methacrylate, N-(2-oxiranyl)-methylacrylamide, N-(2-oxiranyl-methylmethacrylamide, N-(2,3-dihydroxy-1-propyl)-methacrylamide, N-(2-aziridinyl)-methylacrylamide, N-(2-aziridinyl)-methylmethacrylamide, N-(2-thiiranyl)-methylacrylamide, N-(2-thiiranyl)-methylmethacrylamide, 1-(oxiran-2-yl)-2-oxabut-3-ene, glycidyl monovinyl ether, 1-(aziridin-2-yl)-2-oxabut-3-ene, 1-thiiran-2-yl)-2-oxabut-3-ene, 4-(oxiran-2-yl)-but-1-ene, 5,6-dihydroxyhex-1-ene, 5-(oxiran-2-yl)-pent-1-ene, 6,7-dihydroxypent-1-ene, 4-(aziridin-2-yl)-but-1-ene, 5-(aziridin-2-yl)-pent-1-ene, 4-(thiiran-2-yl)-but-1-ene or 5-(thiiran-2yl)-pent-1-ene. Glycidyl methacrylate and oxiran-2-ylmethylol methacrylate are preferred.

Compounds which are suitable for the reaction to introduce radicals (D) are, for example, oxirane, aziridine, thiirane, 2-methyloloxirane, 2-methylolaziridine, 2-methylolthiirane and 2-[ω-methylpoly(ethylene oxide)-α-yl]-oxirane.

Examples of preferred cyclic amines (b₁) of the general formula I which are used for the formation of the novel polymer ammonium salts are morpholine, piperazine, imidazolidine, piperidine, 1,3-thiaazolidine, perhydro-1,4-thiazine, N-ethylmorpholine, N-methylpiperazine, N-ethylpiperazine, N-propylimidazolidine, N-hexyl-1,3-thiaazolidine, N-(2-hydroxyethyl)-piperazine, N-(3-hydroxy-n-propyl)-piperazine, N-(6-hydroxy-n-hexyl)-piperazine, N-[ω-hydroxypoly(ethylene oxide)-α-yl]-piperazine or N-[ω-hydroxypoly(propylene oxide)α-yl]-piperazine, of which piperazine, morpholine, N-ethylpiperazine and N-(2-hydroxyethyl)-piperazine are particularly preferred.

Examples of open-chain amines (b₂) of the general formula II which are preferably used for the formation of the novel polymer ammonium salts are N-methyl-N-(2-hydroxyethyl)-amine, N-ethyl-N-(2-hydroxyethyl)-amine, N-propyl-N-(2-hydroxyethyl)-amine, Nbutyl-N-(2-hydroxyethyl)-amine, N-(pentyl-N-(2-hydroxyethyl)-amine, N-phenyl-(2-hydroxyethyl)-amine, N-methyl-N-(2-hydroxypropyl)-amine, N,N-bis-(2-hydroxypropyl)-amine, N-propyl-N-(5-hydroxy-3-oxapentyl)-amine, N-propyl-N-(8-hydroxy-3,6-dioxaoctyl)-amine, N-propyl-N-((18-hydroxy-3,6,9,12,15-pentaoxaoctadecyl)-amine, N,N-bis-(2-hydroxyethylamine, N-(2-hydroxyethyl)-ethylenediamine, N-(2-hydroxyethyl)-N-(5-hydroxypentyl)-amine, N-(5-hydroxy-3-oxapentyl)-trimethylenediamine, N-(2- hydroxyethyl)-N-(4-hydroxybutyl)-amine, N-(2-hydroxyethyl)-N-[ω-hydroxypoly(ethylene oxide)-α-yl]-amine, in which the mean degree of polymerization $\bar{P}$ of the polyalkylene oxide chain is 15, N,N-bis-[ω-hydroxypoly(ethylene oxide)-α-yl]amine, in which $\bar{P}$ of the polyalkylene oxide chain is 10, N-(2-hydroxyethyl)-N-[ω-aminopoly(ethyleneimine)-α-yl]-amine, in which $\bar{P}$ of the polyalkyleneimine chain is from 15 to 20, N-[ω-hydroxypoly(ethylene oxide)-α-yl]-N-[ω-aminopoly(ethyleneimine)-α-yl]-amine, in which $\bar{P}$ of the polyalkylene oxide chain is from 6 to 10 and $\bar{P}$ of the polyalkyleneimine chain is from 7 to 15, or N-(2-hydroxyethyl)-N-[ω-thiolopoly(ethylene sulfide-α-yl]-amine, in which $\bar{P}$ of the polyalkylene sulfide chain is from 6 to 12. Among these, N,N-bis-(2-hydroxyethyl)-amine [=diethanolamine], N-methyl-N-(2-hydroxyethyl)-amine, N-propyl-N-(2-hydroxyethyl)-amine, N-butyl-N-(2-hydroxyethyl)-amine, N-phenyl-N-(2-hydroxyethyl)-amine, N-methyl-N-(2-hydroxypropyl)-amine, N,N-bis-(2-hydroxypropyl)-amine and N-propyl-N-(5-hydroxy-3-oxapentyl)-amine are particularly preferred Amines (b$_3$) are 1,4-thiazine, N,N',N''-trisvinylmelamine and N,N,N''-trisallylmelamine, of which the first two are preferred.

The amount of the amines (B) which is added to the copolymer (A) for the formation of the salts depends primarily on the number of free carboxyl groups in the copolymer (A). This number can readily be determined in a conventional manner by acid/base titration. In general, the number of free carboxyl groups is referred to as the acid number. This is the amount of potassium hydroxide solution in mg which is necessary to neutralize 1 g of the copolymer (A).

In the novel polymer ammonium salt, all, i.e. 100 mol %, of the free carboxyl groups in the copolymers (A) can be reacted with the amines (B). It may however be advantageous if less than 100 mol % are neutralized. The degree of neutralization should however be no less than 10, advantageously 20, in particular 30, mol %.

The novel polymer ammonium salts can be prepared by combining the desired amounts of components (A) and (B) in solution or in the absence of a solvent, the conventional mixing, kneading and dissolving techniques being used.

The novel polymer ammonium salts are advantageously used for the production of photopolymerizable crosslinkable printing plates, relief plates and photoresists. For this purpose, they are mixed with suitable compatible photoinitiators in effective amounts and, if necessary, suitable compatible photopolymerizable monomers, plasticizers, thermal polymerization inhibitors, dyes and pigments, agents for improving the relief structure, crosslinking assistants, antioxidants, fillers, fluxes or mold release agents. Mixtures of the novel polymer ammonium salts and these additives are referred to below simply as mixtures.

Examples of suitable compatible photoinitiators are benzoin or benzoin derivatives, such as its methyl, isopropyl, n-butyl or isobutyl ether; symmetrically or asymmetrically substituted benzil acetals, such as benzil dimethyl acetal or benzil 1-methyl 1-ethyl acetal, or acylarylphosphine oxides, such as 2-dimethoxybenzoyldiphenylphosphine oxide, 2,4,6-trimethylbenzoyldiphenylphosphine oxide, ethyl 2,4,6-trimethylbenzoylphenylphosphinate or sodium 2,4,6-trimethylbenzoylphenylphosphinate, or substituted and unsubstituted quinones, such as ethylanthraquinone, benzanthraquinone, benzophenone or 4,4'-bis-(dimethylamino)-benzophenone. They can be used alone or as a mixture with one another or in combination with coinitiators, for example ethylanthraquinone with 4,4'-bis-(dimethylamino)-benzophenone, benzoin methyl ether with triphenylphosphine, diacyl phosphine oxides with tertiary amines, or acylarylphosphine oxides with benzil dimethyl acetal. In the mixtures, they are used in an amount of from 0.001 to 10, advantageously from 0.1 to 5, in particular from 0.3 to 2, % by weight, based on the mixture, the amount also being determined by the presence of photopolymerizable monomers.

Suitable compatible photopolymerizable monomers generally have a boiling point above 100° C. under atmospheric pressure and a molecular weight of up to 3000, in particular up to 2000. Examples of suitable compounds are the esters of acrylic acid and/or methacrylic acid with monohydric or polyhydric alcohols, such as butyl acrylate, butyl methacrylate, 2-ethylhexyl acrylate, lauryl (Meth)acrylate, ethylene glycol di(meth)acrylate, butane-1,4-diol di (meth)acrylate, neopentylglycol di(meth)acrylate, 3-methylenepentanediol di(meth)acrylate, 2-hydroxypropyl (meth)acrylate, 2-hydroxyethyl (meth)acrylate, 1,6-hexanediol di(meth)acrylate, 1,1,1-trimethylolpropane tri(meth)acrylate, di-, tri- and tetraethylene glycol di(meth)acrylate, tripropylene glycol di(meth)acrylate or pentaerythritol tetra(meth)acrylate, poly-(ethylene oxide) di(meth)acrylate, ω-methylpoly(ethylene oxide)-α-yl (meth)acrylate, N,N-diethylaminoethyl acrylate or a reaction product of 1 mole of glycerol, 1 mole of epichlorohydrin and 3 moles of acrylic acid; the vinyl esters of aliphatic monocarboxylic acids, such as vinyl oleate; the vinyl ethers of alcohols, such as octadecyl vinyl ether and butane-1,4-diol divinyl ether; the diesters of fumaric and maleic acid; or the reaction products of OH-terminated, oligomeric polybutadienes with maleic acid or (meth)acrylic acid, i.e. oligomeric polybutadienes having active, photopolymerizable olefinic double bonds. In the mixtures, they are used (individually or as mixtures) in an amount of from 1 to 40, advantageously from 3 to 30, in particular from 5 to 20, % by weight, based on a mixture.

Examples of suitable compatible plasticizers are modified and unmodified natural oils and natural resins, such as paraffinic or naphthenic oils, and mineral oil resins or pentaerythritol esters of hydrogenated rosin; esters of alkyl, alkenyl, aralkyl or aralkenyl alcohols with acids such as citric acid, acetic acid, propionic acid, butyric acid, ethyl butyric acid, ethyl hexanoic acid, glycolic acid, benzoic acid, phthalic acid, trimellitic acid, abietic acid, phosphoric acid or stearic acid; synthetic oligomers or resins, such as oligostyrene, oligomeric styrene/butadiene copolymers, oligo-α-methylstyrene, oligomeric α-methylstyrene/vinyltoluene copolymers, liquid 1,2- or 1,4-oligobutadienes, oligopentadienes, liquid oligomeric acrylonitrile/butadiene copolymers and polyterpene, polyacrylate, polyester or polyurethane resins, synthetic polymers, such as polyethylene or ethylene/propylene/diene rubbers; ω-methyl oligo-(ethylene oxide); or sulfonamides. Amounts of from 1 to 25% by weight, based on the mixture, are advantageous.

Suitable compatible thermal polymerization inhibitors are added in general in an amount of from 0.001 to 2% by weight, based on the mixture and have no significant self-absorption in the actinic range in which the photoinitiator absorbs. Examples of suitable inhibitors are hydroquinone, p-methoxyphenol, 2,6-di-tert-butyl-p-cresol, β-naphthol, phenothiazine, pyridine, nitrobenzene, m-dinitrobenzene or chloranil; thiazine dyes, such as Thionine Blue G (C.I. 52025), Methylene Blue B (C.I. 52015) or Toluidine Blue (C.I. 52040); or N-nitrosamines, such as N-nitrosodiphenylamine, or the salts, for example the potassium, calcium or aluminum salts, of N-nitrosocyclohexylhydroxylamine.

Suitable compatible dyes, pigments or photochromic additives can be added to the mixtures in an amount of form 0.0001 to 2% by weight, based on the mixture. They are used for controlling the exposure properties, for identification, for directly checking the exposure result or for esthetic purposes. In selecting the amount of such additives, it is essential that, like the thermal polymerization inhibitors, they do not interfere with the photopolymerization of the mixtures. Examples of suitable dyes are the soluble phenazinium, phenoxazinium, acridinium and phenothiazinium dyes. These dyes are also used together with a sufficient amount of reducing agent which does not reduce the dye in the absence of actinic light but is capable of reducing the dye in the excited electronic state during exposure. Examples of such mild reducing agents are ascorbic acid, anethole, thiourea, e.g. diethylallylthiourea, in particular N-allylthiourea, and hydroxylamine derivatives, in particular salts of N-nitrosocyclohexylhydroxylamine, preferably the potassium, calcium and aluminum salts. As mentioned above, the latter can also serve as thermal polymerization inhibitors. The reducing agents are added in general in amounts of from 0.005 to 5% by weight, based on the mixture, and in many cases the addition of from 3 to 10 times the amount of dye present has proven useful.

Examples of suitable compatible agents for improving the relief structure of the printing plates produced from the mixtures are, for example, 9,9'dianthronyl and 10,10'-bisanthrone.

The mixtures may furthermore contain crosslinking assistants, such as conventional trifunctional and tetrafunctional thiol compounds.

To protect the mixtures from oxidative and thermal oxidative decomposition by atmospheric oxygen, effective amounts of suitable compatible antioxidants may be added to them, for example sterically hindered monophenols, such as 2,6-di-tert-butyl-p-cresol; alkylated thiobis-and alkylidene bisphenols, such as 2,2'-methylenebis-(4-methyl-6-tert-butylphenol) or 2,2'-bis-(1-hydroxy-4-methyl-6-tert-butylphenyl) sulfide; hydroxybenzyls, such as 1,3,5-trimethyl-2,4,6-tris-(3,5-di-tert-butyl-4-hydroxybenzyl)-benzene; triazines, such as 2-(4-hydroxy-3,5-tertbutylanilino)-4,6-bis-(n-octylthio)-1,3,5-triazine; polymerized trimethyldihydroquinone; zinc dibutyldithiocarbamate; dilauryl thiodipropionate; or phosphites, such as tris-(nonylphenyl) phosphite. Amounts of from 0.001 to 5% by weight, based on a mixture, are advantageous.

Examples of suitable polymeric or nonpolymeric, organic and inorganic fillers or reinforcing fillers which are compatible but cannot be mixed in to give a molecular disperse mixture are those which are essentially transparent at the wavelengths of the light used for exposure of the novel mixtures and do not scatter this light and whose refractive index is substantially matched to the relevant mixture, for example polystyrene, organophilic silica, bentonite, silica, organophilic alumina, glass powder, colloidal carbon and various types of dyes and pigments. These additives are used in amounts which vary with the desired properties of the novel materials. The fillers have the advantage that they improve the strength of the mixtures based on the novel polymer ammonium salts, help to reduce the tack and may be effective color-imparting materials.

The mixtures may furthermore contain suitable fluxes, such as calcium stearate, and/or mold release agents, such as talc, in effective amounts.

When the mixtures are used as photopolymerizable adhesive materials and sealant materials, it is advisable to add tackifying resins, for example paraffin resins, rosin esters, polyterpenes or coumarone/indene resins.

The amount of the additives, which may or may not be used, should not exceed in general 50, in particular 40, % by weight, based on the mixture.

For the preparation of the mixtures from the components, the usual kneading, mixing and dissolving techniques may be used.

The mixtures thus obtained can be used directly as photocrosslinkable adhesive materials and sealant materials or may be further processed to give photopolymerizable printing plates, relief plates or photoresists. For this purpose, they are shaped to layers of the desired thickness in a conventional manner by casting from a solution, hot pressing, calendering or extrusion. The thickness depends primarily on the intended use of these layers. It varies in general from 0.001 to 7 mm, in particular from 0.025 to 6.5 mm. The printing plates which have layers of this thickness are suitable for the majority of the printing techniques.

The layers may be processed as such to give photopolymerizable printing plates, relief plates and photoresists; however, it is usual to produce them as a laminate with other layer-like materials before carrying out further processing. Such a laminate is generally referred to as a multilayer element, and the layer of the mixture present therein is referred to as the relief-forming layer (RL).

Usually, such a multilayer element contains a relief-forming layer (RL) which is firmly attached to a dimensionally stable base (B) or is readily detachable from the said base. The dimensionally stable base (B) in turn may possess a resilient and flexible lower layer (LL) underneath. Furthermore, a cover sheet (CS) and/or a cover film (CF) may be applied to that side of the layer (RL) which faces away from the base (B). If the cover sheet (CS) and cover film (CF) are used together, (CS) is directly on top of the layer (RL), and an antiadhesion layer (AL) may be present between (CS) and (CF). Furthermore, a firm bond may be achieved between (B) and (RL) and, if necessary, (RL) and (CF) with the aid of an adhesive layer (A).

Sheets, films or conical or cylindrical sleeves of metals, such as steel, aluminum, copper or nickel, or of plastics, such as polyethylene terephthalate, polybutylene terephthalate, polyamide or polycarbonate, may be used as the dimensionally stable base (B). Woven and nonwoven fabrics, e.g. glass fiber fabrics, or composite materials of, for example, glass fibers and plastics, such as polyethylene terephthalate, are also suitable.

Advantageously used adhesive layers (A) are conventional adhesive layers about 0.5–40 μm thick.

Suitable cover sheets (CS) are in general from 0.5 to 20 μm thick and may consist of a polymer which forms soluble, nontacky, transparent and strong films, for example polyamides, amide copolymers, polyurethanes, polyvinyl alcohol, polyvinylpyrrolidone, polyethylene oxide having a molecular weight greater than 105 or cyclized rubber having a high degree of cyclization. If necessary, (CS) may be matt.

Suitable cover films (CF) are in general from 20 to 150 μm thick and consist of, for example, a polymer such as a polyamide or polyethylene terephthalate.

Suitable antiadhesion layers (AL) are in general from 0.1 to 0.5 μm thick and consist of, for example, silicone resins.

If highly reflective sheets or films are used as the base (B), they may contain suitable antihalation agents, such as carbon black or manganese dioxide. However, the antihalation agents may also be applied as a separate layer to (B) or may be present in the adhesive layer (A) or in the relief-forming layer (RL).

Such multilayer elements can be produced by applying the relief-forming layer (RL) to the base (B) by casting from solution, or pressing, calendering or extrusion. The other layers can then be applied to this two-layer element in a conventional manner. However, it is also possible first to apply the relief-forming layer (RL) to that side of a cover film (CF) which is covered with a cover sheet (CS) and then to bond the uncovered side of the layer (RL) firmly or detachably to the base (B).

Crosslinked printing plates, relief plates and photoresists can be produced, by photopolymerization, from the layers which consist of the mixtures or from the multilayer elements which contain the relief-forming layers (RL) of the mixtures.

The conversion of photopolymerizable printing plates, relief plates or photoresists into printing plates, relief plates or photoresists is carried out, if necessary after a pretreatment, by imagewise exposure to actinic light having a wavelength of from 230 to 450 nm, advantageously from 300 to 450 nm, through a photographic negative placed on top, washing out of the unexposed and therefore non-photopolymerized uncrosslinked parts of the printing plates, relief plates and photoresists with the aid of water or an aqueous solution, and drying of the resulting plates and photoresists which consist of a relief layer (RL') or contain such a layer.

Suitable sources of actinic light are commercial UV fluorescence tubes, medium pressure, high pressure and low pressure mercury lamps, superactinic fluorescent tubes, pulsed xenon lamps, such as metal iodide-doped lamps, or carbon arc lamps.

The thickness of the relief layer (RL') of the photopolymerizable printing plates, relief plates and photoresists varies, depending on the intended use, from 0.001 to 7 mm. Thicknesses of from 0.025 to 6.5 mm are advantageous.

The printing plates obtained in this manner can be mounted on printing cylinders and used for continuous printing.

The mixtures based on the novel polymer ammonium salts have many advantages in their preparation and processing. For example, they can be very readily processed by the conventional methods, and in particular their good meterability in crumb form facilitates the charging of extruders, with the result that the use of parting agents can generally be dispensed with. The processed photopolymerizable materials, printing plates, relief plates and photoresists are clean and transparent, which in particular permits the production of photopolymerizable printing plates, relief plates and photoresists having relief layers (RL') which possess very great relief heights and a good side-wall structure. This is absolutely essential, for example, for printing on rough, corrugated surfaces, for example corrugated board, cardboard boxes or serviettes. Relief heights of more than 3 mm can therefore be produced without problems as in the case of conventionally embossed rubber plates, without the depths of the layers being closed up by polymerization. Furthermore, the transparency of the mixtures permits short exposure times without resulting in an unacceptable polymerization gradient in the materials or in the relief layers (RL') of the printing plates, relief plates and photoresists. The exposes materials, printing plates, relief plates and photoresists are stable to chemical and physical effects and are not tacky. Moreover, the exposed printing plates, relief plates and photoresists can be developed with water. The developed materials have high resistance to printing ink solvents and high abrasion resistance, which permits very long print runs. Their main advantages are their resistance to ozone cracking and their excellent extendability and tensile strength.

EXAMPLES

In the examples below, acid number is the amount of 100% strength KOH in mg which is required for neutralizing the carboxyl groups present in 1 g of product. The elongation at break was determined according to DIN 53 504. The tendency to cracking was determined in an ozone chamber at an ozone concentration of 50 ppm and at 25° C. on 10 cm long samples which had been subjected to 10% longitudinal elongation; the criterion for ozone stability was that no cracks occurred within 10 hours. The melt flow index (MFI) was determined at 190° C. under an applied force of 2.16 kp.

Preparation of the Copolymers $(A_1)$ and $(A_2)$

For the examples according to the invention, the copolymers $(A_1)$ and $(a_2)$ were prepared by the LDPE (=low density polyethylene) high pressure polymerization method. The monomer mixture used for the preparation of $(A_1)$ consisted of:

(a₁) 57% by weight of ethylene,
(a₂) 19% by weight of acrylic acid,
(a₃) 12% by weight of ω-methylpoly(ethylene oxide)-α-yl acrylate (mean degree of polymerization $\bar{P}$ of the polyalkylene oxide chain: (15) and
(a₃) 12% by weight of 2-ethylhexyl acrylate.

The monomer mixture used for the preparation of $(A_2)$ consisted of:

(a₁) 49% by weight of ethylene,
(a₂) 19% by weight of acrylic acid,
(a₃) 10% by weight of ω-methylpoly(ethylene oxide)-α-yl acrylate ($\bar{P}$=15) and
(a₃) 22% by weight of 2-ethylhexyl acrylate.

The melt flow index (MFI) of the copolymer $(A_1)$ was 20. Its acid number was determined as 145, from which a content of about 0.26 mole of carboxyl groups per 100 g of copolymer $(A_1)$ was calculated.

The melt flow index (MFI) of the copolymer $(A_2)$ was 350. Its acid number was determined as 146, from which a content of about 0.26 mole of carboxyl groups per 100 g of copolymer $(A_2)$ was calculated.

Preparation of the copolymer $(A_3)$ by introducing side radicals (C) into the copolymer $(A_1)$.

1000 g of the copolymer $(A_1)$ together with 630 mg of p-dimethylaminopyridine and 630 mg of 2,6-di-tert-butyl-p-cresol were dissolved in 2.2 l of dry tetrahydrofuran at from 40° to 50° C. 113 g of glycidyl methacrylate were added dropwise to this solution in the course of 50 minutes. The resulting solution was stirred for 5 hours at 50° C. Removal of the solvent gave the transparent resilient and flexible copolymer $(A_3)$, 27 mol % of whose carboxyl groups were esterified. The copolymer (a3) contained less than 0.1% by weight, based on (A3), of free glycidyl methacrylate. The content of its free carboxyl groups was calculated as 0.19 mole per 100 g of product, which was confirmed by the acid number of 106.

novel polymer ammonium salts. The presence or absence of haze was assessed visually. The tack was determined by touch.

Table 1 shows that the resulting odorless thermoplastic elastomers 1-1 to 1-25 were without haze and were nontacky.

TABLE 1

| | | Novel polymer ammonium salts | | | | | | |
|---|---|---|---|---|---|---|---|---|
| | 100 g | Amine (B) (b$_1$) | | (b$_2$) | | (b$_3$) | Polymer ammonium salt | |
| No. | copolymer | mol % | | mol % | | mol % | Haze | Tack |
| 1-1 | (A$_1$) | piperazine | 80 | — | | — | none | none |
| 1-2 | (A$_1$) | piperazine | 50 | — | | — | " | " |
| 1-3 | (A$_1$) | morpholine | 100 | — | | — | " | " |
| 1-4 | (A$_1$) | morpholine | 30 | — | | — | " | " |
| 1-5 | (A$_1$) | N—ethyl-piperazine | 95 | — | | — | " | " |
| 1-6 | (A$_1$) | N—(2-hydroxyethyl)-piperazine | 60 | — | | — | " | " |
| 1-7 | (A$_1$) | — | | N,N—bis-(2-hydroxyethyl)-amine | 100 | — | " | " |
| 1-8 | (A$_1$) | — | | N,N—bis-(2-hydroxyethyl)-amine | 55 | — | " | " |
| 1-9 | (A$_1$) | — | | N—propyl-N—(2-hydroxyethyl)-amine | 100 | — | " | " |
| 1-10 | (A$_1$) | — | | N—propyl-N—(2-hydroxyethyl)-amine | 60 | — | " | " |
| 1-11 | (A$_1$) | — | | N—propyl-N—(2-hydroxyethyl)-amine | 25 | — | " | " |
| 1-12 | (A$_1$) | — | | N—butyl-N—(2-hydroxyethyl)-amine | 96 | — | " | " |
| 1-13 | (A$_1$) | — | | N—propyl-N—(5-hydroxy-3-oxapentyl)-amine | 50 | — | " | " |
| 1-14 | (A$_3$) | piperazine | 97 | — | | — | " | " |
| 1-15 | (A$_3$) | — | | N—propyl-N—(2-hydroxyethyl)-amine | 100 | — | " | " |
| 1-16 | (A$_3$) | — | | N—propyl-N—(2-hydroxyethyl)-amine | 30 | — | " | " |
| 1-17 | (A$_3$) | piperazine | 45 | N—propyl-N—(2-hydroxyethyl)-amine | 55 | — | " | " |
| 1-18 | (A$_1$) | — | | N—methyl-N—(2-hydroxyethyl)-amine | 80 | — | " | " |
| 1-19 | (A$_2$) | — | | N—phenyl-N—(2-hydroxyethyl)-amine | 60 | — | " | " |
| 1-20 | (A$_3$) | — | | N—methyl-N—(2-hydroxypropyl)-amine | 90 | — | " | " |
| 1-21 | (A$_1$) | — | | N,N—bis-(2-hydroxypropyl)-amine | 85 | — | " | " |
| 1-22 | (A$_1$) | — | | N—(2-hydroxyethyl)-ethylenediamine | 50 | — | " | " |
| 1-23 | (A$_2$) | — | | — | | 1,4-thiazine 95 | " | " |
| 1-24 | (A$_1$) | — | | — | | N,N',N''—tris-vinylmelamine 99 | " | " |
| 1-25 | (A$_3$) | N—(2-hydroxyethyl)-piperazine | 20 | N—propyl-N—(2-hydroxyethyl)-amine | 20 | 1,4-thiazine 40 | " | " |

EXAMPLE 1

Preparation of the Polymer Ammonium Salts According to the Invention 100 g of copolymer (A$_1$), (A$_2$) or (A$_3$) were reacted with equimolar or smaller amounts of amines (b$_1$), (b$_2$) and/or (b$_3$) in dry tetrahydrofuran. The term equimolar relates to the number of free carboxyl groups in the copolymers (A) and to the number of amino groups in the amines (B) with which the carboxyl groups are reacted to give ammonium salts. Accordingly, for example, 80 mol % of amine (B) means the amount of amine (B) which converts 80 mol % of the carboxyl groups of copolymer (A) into ammonium salt groups.

Table 1 shows the type and amount of the starting materials used and relevant properties of the resulting

COMPARATIVE EXPERIMENT V1

Preparation of Polymer Ammonium Salts not According to the Invention

The procedure described in Example 1 was followed, except that, instead of the amines (b$_1$), (b$_2$) and (b$_3$) to be used according to the invention, other amines were used.

Table 2 shows the type and amount of the starting materials used and relevant properties of resulting polymer ammonium salts not according to the invention.

Comparison of Tables 1 and 2 shows that the known polymer ammonium salts were inferior to the novel ones. Moreover, the known salts V1-1 to V1-12 were not completely odorless.

TABLE 2

| | | Polymer ammonium salts not according to the invention | | | |
|---|---|---|---|---|---|
| | 100 g of | Amine | | Polymer ammonium salt | |
| No. | copolymer | | mol % | Haze | Tack |
| V1-1 | (A$_1$) | ethylenediamine | 50 | none | slight |
| V1-2 | (A$_3$) | " | 100 | strong | slight |
| V1-3 | (A$_1$) | diethylenetriamine | 50 | none | none |
| V1-4 | (A$_3$) | N—methyl-N—ethylethylenediamine | 95 | strong | none |
| V1-5 | (A$_1$) | N—dimethylethylenediamine | 90 | none | slight |
| V1-6 | (A$_3$) | N,N'—diethylethylenediamine | 87 | weak | slight |
| V1-7 | (A$_1$) | N,N,N'',N''—tetramethylethylenetriamine | 94 | weak | none |
| V1-8 | (A$_3$) | 1,3-diaminopropane | 100 | weak | slight |
| V1-9 | (A$_3$) | 1,4-diaminobutane | 96 | marked | slight |
| V1-10 | (A$_3$) | pyrazine | 67 | none | marked |
| V1-11 | (A$_1$) | pyrazine | 50 | none | marked |
| V1-12 | (A$_1$) | pyrazine | 95 | slight | marked |
| V1-13 | (A$_1$) | polyvinylpyrrolidone | 30 | strong | none |
| V1-14 | (A$_1$) | polyvinylpyrrolidone | 50 | strong | none |
| V1-15 | (A$_1$) | polyvinylpyrrolidone | 73 | very strong | none |

EXAMPLE 2

Preparation and Further Processing of Photopolymerizable Mixtures Based on the Novel Polymer Ammonium Salts The photopolymerizable mixtures based on the novel polymer ammonium salts were prepared by extrusion of the components in a twin-screw extruder.

The extruded mixtures were discharged through a sheet die onto 125 μm thick polyethylene terephthalate films and then calendered so that 3 mm thick layers of the mixtures resulted. The layers were then covered with 10 μm thick polyethylene terephthalate films.

Table 3 shows the type and amount of components used.

The multilayer elements obtained in this manner were exposed uniformly in a commercial flat-plate exposure unit for 20 minutes. The polyethylene terephthalate films were then removed from the layers 2-1 to 2-6 (Table 3) crosslinked by photopolymerization.

To measure the elongation at break, the layers were cut into 15 cm long 1.5 cm wide strips.

Table 3 gives the mean value of the elongation at break of the photopolymerized layers 2-1 to 2-6, determined for 5 strips in each case.

Table 3 shows that, with the aid of the novel polymer ammonium salts, photopolymerized layers having an elongation at break of more than 90% can be produced in a simple manner.

Moreover, neither the photopolymerized mixtures nor the multilayer elements produced therefrom nor the photopolymerized layers exhibited exudation of the amine component. In addition, the layers were ozone-stable, no cracks occurring within 10 hours.

COMPARATIVE EXPERIMENTS V2 AND V3

Preparation and Further Processing of Photopolymerizable Mixtures Based on Polymer Ammonium Salts not According to the Invention The procedure described in Example 2 was followed, except that, instead of the amines (B) to be used according to the invention, ethylenediamine and pyrazine were employed.

Table 3 shows the type and amount of the components used and the elongation at break of the photopolymerized layers.

The elongation at break of the layers V2 and V3 was lower than that of the layers 2-1 to 2-6 and did not reach 90% (cf. Table 3). Furthermore, the comparative mixtures and the multilayer elements produced therefrom and layers V2 and V3 tended to exhibit exudation of the amine component.

TABLE 3

| Photopolymerizable mixture based on the novel polymer ammonium salts, and comparative experiments V2 and V3 | | | | | | | | | |
|---|---|---|---|---|---|---|---|---|---|
| Mixture, multilayer element and layer No. | Copolymer (A$_3$) % by weight | Hexanediol diacrylate % by weight | Phenylethyl methacrylate % by weight | Benzil dimethyl acetal % by weight | 2,6-di-tert-butyl p-cresol % by weight | Plasticizer based on sulfonamide[a] % by weight | Amine (B) | % by weight | Elongation at break according to DIN 53,504 % |
| 2-1 | 63 | 4 | 3 | 1.5 | 0.5 | 19 | piperazine, | 9 | 580 |
| 2-2 | 63 | 4 | 3 | 1.5 | 0.5 | 23 | " | 5 | 190 |
| 2-3 | 63 | 4 | 3 | 1.5 | 0.5 | 15.5 | N—ethyl-piperazine | 12.5 | 200 |
| 2-4 | 63 | 4 | 3 | 1.5 | 0.5 | 15.5 | N—(2-hydroxy-ethyl)-piperazine, | 12.5 | 320 |
| 2-5 | 63 | 4 | 3 | 1.5 | 0.5 | 19 | morpholine | 9 | 360 |
| 2-6 | 63 | 4 | 3 | 1.5 | 0.5 | 15.5 | N—propyl-N—(2-hydroxyethyl)-amine | 12.5 | 100 |
| Comparative experiments | | | | | | | | | |
| V2 | 63 | 4 | 3 | 1.5 | 0.5 | 17 | ethylene-diamine | 11 | 70 |
| V3 | 63 | 4 | 3 | 1.5 | 0.5 | 12.8 | pyrazine | 15.2 | 80 |

[a] ® Cetamoll BMB from BASF AG was used

EXAMPLE 3

Preparation of Photopolymerizable Mixtures Based on the Novel Polymer Ammonium Salts and Their Use for the Production of Photopolymerized Printing Plates Multilayer elements were produced by the extrusion method stated in Example 2. Here, in contrast to Example 2, 0.3 m wide and 0.6 m long steel sheets provided with a layer of adhesive-forming components were used as the base (B), instead of the 125 μm thick polyethylene terephthalate films.

The resulting multilayer elements were exposed imagewise to actinic light for 90 seconds through a standard negative.

After the 10 μm thick polyethylene terephthalate films had been peeled off from the exposed multilayer elements, the latter were developed in a commercial brush washer for rubbing out with water at from from 50° to 60° C. The resulting photopolymerized printing plates had a base (B), an adhesive layer (A) and a relief layer (RL').

reproduction suffering in any way. Even after storage for several weeks, the printing plates still gave the same excellent printed copies.

COMPARATIVE EXPERIMENTS V4 AND V5

Preparation of Photopolymerizable Mixtures Based on Polymer Ammonium Salts not According to the Invention and Their Use for the Production of Photopolymerized Printing Plates Photopolymerized printing plates based on known mixtures were produced by the method stated in Example 3.

Table 4 shows the type and amount of the components used and the quality of the printing plate reliefs.

Table 4 shows that the printing plates produced from polymer ammonium salts not according to the invention were of inferior quality. Moreover, visual assessment showed that parts of the considerably swollen relief layers (RL') had been torn out during development in the brush washer. Hence, no printing tests were carried out.

TABLE 4

Printing plates based on novel polymer ammonium salts, and comparative experiments V4 and V5

| Printing plate No. | Photopolymerizable mixture of the relief-forming layer | Quality of the printing plate relief | Observations |
|---|---|---|---|
| 3-1 | Mixture 2-6, Example 2, Table 3 | very good | |
| 3-2 | As for mixture 2-6, Exmaple 2, Table 3, except that 16% by weight of N—butyl-N—(2-hydroxyethyl)-amine were used instead of 12.5% by weight of N—propyl-N—(2-hydroxyethyl)-amine and 12% by weight of plasticizer were used instead of 15.5% by weight; | very good | |
| 3-3 | as for mixture 2-6, Example 2, Table 3, except that 12.5% by weight of N,N—bis-(2-hydroxyethyl)-amine were used instead of 12.5% by weight of N—propyl-N—(2-hydroxyethyl)-amine; | very good | very short wash-out times (t < 1 minute) |
| 3-4 | mixture 2-4, Example 2, Table 3; | very good | |
| 3-5 | as for mixture 2-6, Example 2, Table 3, except that, instead of 12.5% by weight of N—propyl-N—(2-hydroxyethyl)-amine, a mixture of 6% by weight of this amine and 4% by weight of N—(2-hydroxyethyl)-piperazine was used, and 18% by weight of plasticizer were used instead of 15% by weight; | very good | very short wash-out times (t < 1 minute) |
| V4 | mixture $V_2$, Comparative Experiment $V_2$, Table 3 | moderate | pronounced swelling, relief parts torn out |
| V5 | mixture $V_3$, Comparative Experiment $V_3$, Table 3; | useless | pronounced swelling, relief parts torn out |

The quality of the relief layers (RL') was determined visually, the criteria for assessment being the reproduction of fine image elements, the planarity of the printing surfaces, the relief height and the sidewall structure. Where all features met the highest quality requirements, the rating very good was awarded, where one feature failed to meet these requirements, the rating moderate was awarded, and where the majority of the features failed to meet these requirements the rating useless was awarded.

Table 4 shows the type and amount of components used and the quality of the relief layers (RL') of the photopolymerized printing plates.

Table 4 shows that all printing plates 3-1 to 3-5 have excellent relief layers (RL') which meet the highest requirements.

The printing plates 3-1 and 3-5 were clamped on a printing cylinder and used for printing on a conventional flexographic printing unit. The printing plates proved to have very good ink-conveying properties and to be resistant to printing ink solvents, abrasion-resistant, pick-resistant and crack-resistant. This permitted print runs of over $10^5$ copies without the quality of

EXAMPLE 4

Preparation of a Photopolymerizable Mixture Based on a Novel Polymer Ammonium Salt and its Use for the Production of a Photopolymerized Printing Plate The mixture was prepared by extrusion of
74 parts by weight of copolymer ($A_2$),
2.8 parts by weight of glycidyl methacrylate,
0.03 parts by weight of dimethylaminopyridine,
5 parts by weight of hexanediol diacrylate,
10 parts by weight of a plasticizer based on sulfonamide (Cetamoll® BMB from BASF Aktiengesellschaft was used),
5 parts by weight of N,N,-bis-(2-hydroxyethyl)-amine,
2 parts by weight of benzil dimethyl acetal,
1.164 parts by weight of 2,6-di-tert-butyl-p-cresol and
0.006 parts by weight of Sudan Deep Black BB (C.I. 26150)
in a twin-screw extruder at 150° C. and for a residence time of 3 minutes. The mixture was applied from a sheet die onto a 125 μm thick polyethylene terephthalate film, brought to a thickness of 3000 μm by means of calender rolls and covered with a 3 μm thick layer of polyvinyl alcohol.

The resulting multilayer element (printing plate) was exposed uniformly for 3 minutes through the polyethylene terephthalate film and then exposed imagewise for 15 minutes through a photographic negative placed on the polyvinyl alcohol layer.

After removal of the negative, the printing plate was developed with water at 50° C. in a brush washer. The resulting photopolymerized printing plate was dried for 30 minutes at 40° C. in a through-circulation dryer.

The printing plate had a very good relief layer (RL') with a relief height of 900 μm. The relief edges and sidewalls were very well formed; there was no detectable underwashing or broken edges. The relief layer (RL') met the highest quality requirements. It was therefore rated very good.

The printing plate was clamped on a printing cylinder and used on a conventional flexographic printing unit for printing. The printing plate proved to have good ink-conveying properties and was resistant to printing ink solvents, abrasion-resistant, pick-resistant and crack-resistant, so that excellent printed copies were obtained in a long print run.

We claim:

1. A polymer ammonium salt which is formed from a copolymer (A) and from one or more amines (B), the copolymer (A) being obtained by copolymerizing a monomer mixture:

($a_1$) ethylene, ($a_2$) acrylic acid and/or methacrylic acid and ($a_3$) one or more further monomers from the group consisting of vinyl esters, vinyl ethers, acrylates, methacrylates, acrylamides and methacrylamides, for whose weight ratios the following conditions apply:

parts by weight of ($a_1$)+($a_2$)+($a_3$)=100, 30 parts by weight $\leq$ parts by weight of ($a_1$) $\leq$ 70 parts by weight, 5 parts by weight $\leq$ parts by weight of ($a_2$) $\leq$ 50 parts by weight, and 5 parts by weight $\leq$ parts by weight of ($a_3$) $\leq$ 40 parts by weight, wherein the amines (B) are selected from the group consisting of:

($b_1$) cyclic amines of the formula I

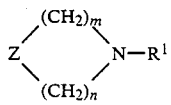

where $R^1$ is hydrogen, $C_1$–$C_6$-alkyl, -hydroxy-$C_1$–$C_6$-alkyl or (ω-hydroxypolyalkylene oxide)-α-yl, Z is oxygen, sulfur, NH or $C_1$–$C_5$-alkylidene and n and m are each an integer from 1 to 4, ($b_2$) open-chain amines of the formula II

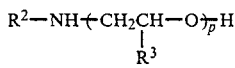

where $R^2$ is $C_1$–$C_5$-alkyl, phenyl, hydroxyl, ω-amino-or ω-thiolo-$C_2$–$C_{10}$-alkyl or a (ω-hydroxypolyalkylene oxide), (ω-aminopolyalkyleneimine) or (ω-thiolopolyalkylene sulfide)-α-yl, $R^3$ is hydrogen or $C_1$–$C_5$-alkyl and p is from 1 to 10, and ($b_3$) 1,4-thiazine, N, N',N"-trisvinylmelamine and N,N',N"-trisallylmelamine, or mixtures thereof.

2. The polymer ammonium salt of claim 1, wherein the following conditions apply to the weight ratios of the monomers ($a_1$), ($a_2$) and ($a_3$):

parts by weight of ($a_1$)+($a_2$)+($a_3$)=100, 40 parts by weight $\leq$ parts by weight of ($a_1$) $\leq$ 60 parts by weight, 8 parts by weight $\leq$ parts by weight of ($a_2$) $\leq$ 30 parts by weight and 20 parts by weight $\leq$ parts by weight of ($a_3$) $\leq$ 40 parts by weight.

3. The polymer ammonium salt of claim 1, wherein the copolymer (A) contains side radicals (C) which have been introduced into the copolymer (A) by a polymer-analogous reaction and are of the formula III

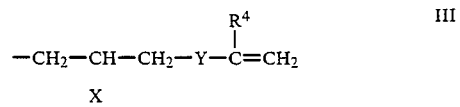

where X is hydroxyl, amino or thiol, Y is an ester, amide ether or $C_1$–$C_{10}$-alkanediyl group and $R^4$ is hydrogen or methyl.

4. The polymer ammonium salt of claim 1, wherein the copolymer (A) contains side radicals (D) which have been introduced into the copolymer (A) by a polymer-analogous reaction and are of the formula IV

where $R^5$ is a polar group, hydrogen or a further group X and X is hydroxyl, amino or thiol.

5. The polymer ammonium salt of claim 1, wherein the amine ($b_1$) is piperazine, morpholine, N-ethylpiperazine and/or N-(2-hydroxyethyl)-piperazine.

6. The polymer ammonium salt of claim 4, which contains side radicals (D) which have been introduced by a polymer-analogous reaction and in which $R^5$ is ω-alkylpoly-(ethylene oxide)-α-oxyl.

7. The polymer ammonium salt of claim 1, wherein component ($a_3$) is n-butyl acrylate, 2-ethylhexyl acrylate, dicyclopentadienyl acrylate and/or ω-methylpoly-(ethylene oxide)-α-yl acrylate.

8. A photopolymerizable mixture containing a photoinitiator and the polymer ammonium salt of claim 1.

* * * * *